(12) United States Patent
Bastian et al.

(10) Patent No.: US 8,972,537 B2
(45) Date of Patent: Mar. 3, 2015

(54) PRIORITIZING LOCAL AND NETWORK TRAFFIC

(75) Inventors: Chris Bastian, Glenmoore, PA (US); Sam Chernak, Ambler, PA (US); Daniel Herscovici, Princeton Junction, NJ (US); Bryan Witkowski, Philadelphia, PA (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 123 days.

(21) Appl. No.: 13/210,635

(22) Filed: Aug. 16, 2011

(65) Prior Publication Data

US 2013/0046863 A1 Feb. 21, 2013

(51) Int. Cl.
*G06F 15/16* (2006.01)
*H04L 12/851* (2013.01)
*H04L 12/859* (2013.01)

(52) U.S. Cl.
CPC ........ *H04L 47/2483* (2013.01); *H04L 47/2475* (2013.01); *H04L 47/2408* (2013.01); *H04L 47/2433* (2013.01)
USPC ........... 709/220; 709/225; 709/226; 709/240; 370/390

(58) Field of Classification Search
CPC . H04L 63/123; H04L 43/062; H04L 63/0435; H04L 67/104; H04L 67/108; H04L 65/604
USPC .......... 709/220, 226, 225, 240; 370/390, 329, 370/290
See application file for complete search history.

(56) References Cited

U.S. PATENT DOCUMENTS

| | | | |
|---|---|---|---|
| 6,418,477 B1 * | 7/2002 | Verma | 709/240 |
| 6,640,248 B1 * | 10/2003 | Jorgensen | 709/226 |
| 6,950,434 B1 * | 9/2005 | Viswanath et al. | 370/392 |
| 6,963,547 B1 * | 11/2005 | Kwak et al. | 370/310.1 |
| 6,971,108 B1 * | 11/2005 | Clark et al. | 719/316 |
| 7,885,644 B2 * | 2/2011 | Gallagher et al. | 455/414.2 |
| 2002/0055990 A1 * | 5/2002 | Vaman et al. | 709/220 |
| 2003/0212999 A1 * | 11/2003 | Cai | 725/119 |
| 2003/0219022 A1 * | 11/2003 | Dillon et al. | 370/395.52 |

(Continued)

FOREIGN PATENT DOCUMENTS

EP 2262170 A1 12/2010
WO 02/41642 A2 5/2002

OTHER PUBLICATIONS

"HGI Guideline Document: QoS White Paper", Home Gateway Initiative, pp. 1-31, Jun. 26, 2009.

(Continued)

*Primary Examiner* — Tesfay Yohannes
(74) *Attorney, Agent, or Firm* — Banner & Witcoff, Ltd.

(57) ABSTRACT

According to some aspects as described herein, a user may purchase or otherwise be provided with an accelerated service for selected software applications, devices, and/or ports to experience a high level of communication. The accelerated service may be created, for example, by using a dedicated network data flow such that the user's customer premise equipment (CPE) network access device may put priority traffic in a different upstream data flow than the commonly shared flow, which may involve tagging the traffic upstream to the network with a priority indicator such as a flow identifier. Based on similar factors, the user may also control local priority of data received downstream from the network for distribution to one or more local devices.

19 Claims, 5 Drawing Sheets

(56) References Cited

U.S. PATENT DOCUMENTS

| | | | |
|---|---|---|---|
| 2006/0143710 A1* | 6/2006 | Desai et al. | 726/23 |
| 2006/0268716 A1* | 11/2006 | Wijting et al. | 370/235 |
| 2007/0050502 A1* | 3/2007 | Barker | 709/225 |
| 2009/0041058 A1* | 2/2009 | Ikeda et al. | 370/475 |
| 2009/0086688 A1* | 4/2009 | Kvache et al. | 370/338 |
| 2010/0246436 A1* | 9/2010 | Yang et al. | 370/254 |
| 2010/0312892 A1 | 12/2010 | Woundy et al. | |
| 2011/0016479 A1* | 1/2011 | Tidwell et al. | 725/9 |
| 2011/0142042 A1* | 6/2011 | Field | 370/390 |
| 2012/0144063 A1* | 6/2012 | Menchaca et al. | 709/240 |
| 2013/0024901 A1* | 1/2013 | Sharif-Ahmadi et al. | 725/114 |

OTHER PUBLICATIONS

Extended European Search Report—EP 12177077.0—Mailing Date: Dec. 5, 2013.

* cited by examiner

PRIORITIZING LOCAL AND NETWORK TRAFFIC

BACKGROUND

In today's customer environments, congestion may be induced by parallel software applications and devices competing for available bandwidth within a user's home network and/or on a service provider network. Some devices and software applications are particularly sensitive to delay, jitter and packet loss. For example, it is not uncommon for the user of a gaming application to experience network-related delays sufficient to negatively impact game play.

SUMMARY

According to some aspects as described herein, a user (e.g., a customer) of a network service provider may obtain (e.g., purchase) an accelerated service for selected software applications, devices, and ports to experience a high level of responsive communication. The accelerated service may be created, for example, by using a dedicated network data flow such that the user's network access device may put priority traffic in a different data flow than the commonly shared flow, which may involve tagging the traffic upstream to the service provider network with a priority indicator such as a flow identifier. Creating such a data flow dedicated to priority data may be sufficient to mitigate any delay issues that would otherwise be caused by queuing delays during local or network congestion.

According to further aspects, the user's device such as a CPE network access device (e.g., home gateway, modem, computer, etc.) may tag certain data packets with priority indicators that may be recognized, and honored, by at least a portion of the user's local network and/or the service provider network. For example, the network access device may tag upstream packets with priority indicators according to their determined priority. In turn, the network's termination system, or similar device, may recognize and prioritize the packets based on the priority indicators so as to potentially reduce latency of those packets within the network. Regardless of the type of network access link, the network access device may itself also separately queue prioritized packets for transmission to the network termination system to potentially further reduce latency. Tagging may be performed based on user configuration parameters, and may be adjusted on an application-by-application basis, such that data traffic for different software applications may be tagged differently based on the user's preference.

According to further aspects, the user's network access device may review data packets, such as by performing deep-packet inspection, to recognize whether the data packets are associated with one or more predetermined software applications, such as a gaming application or other application that user decides would benefit from a lower-latency connection. The data packets may be prioritized according to the software application determined to be associated with the data packets. In performing such a review, the network device may compare packets with one or more software application signatures. The application signature may be provided by the user, pre-stored in the CPE network access device, and/or downloaded via the service provider network such as from a centralized application signature database that is accessible by multiple users. In further examples, the user's network access device may additionally or alternatively prioritize data packets based on device identifiers (e.g., MAC and/or IP address), logical port, and/or physical port.

Some aspects are directed to apparatuses, software, and methods for receiving, by a device such as a customer premises equipment (CPE) computing device, user input identifying a software application, and determining, by the CPE computing device, whether a first data packet received by the CPE computing device is associated with said software application. The CPE computing device may further generate a second data packet based on the first data packet that includes a priority indicator, the priority indicator depending upon whether the first data packet is associated with said software application. The CPE computing device may further send the second data packet including the priority indicator to a service provider network.

Still further aspects may be directed to a customer premises equipment (CPE) computing device for providing communication between a local device and a service provider network. The CPE computing device may comprise a non-transitory computer-readable medium storing computer-executable instructions, and a processor configured to execute the computer-executable instructions. When executed, the computer-executable instructions may cause the CPE computing device to determine whether a first data packet received from the local device is associated with a software application identified by user input to the CPE computing device, and to generate a second data packet based on the first data packet that includes a priority indicator, the priority indicator depending upon whether the first data packet is associated with said software application. The CPE computing device may further send the second data packet including the priority indicator to the service provider network.

Yet further aspects may be directed to apparatuses, software, and method in connection with a customer premises equipment (CPE) computing device coupled to a local area network using Internet Protocol (IP) and to a service provider network. For instance, the CPE computing device may determine a software application signature based on user input received at the CPE computing device. When the CPE computing device receives a first data packet via the local area network, the CPE computing device may determine one or more QoS parameter values based on a comparison of the first data packet with the software application signature, and send a second data packet based on the first data packet to the service provider network including an indication of the QoS parameter values.

These and other aspects of the disclosure will be apparent upon consideration of the following detailed description.

BRIEF DESCRIPTION OF THE DRAWINGS

A more complete understanding of the present disclosure and the potential advantages of various aspects described herein may be acquired by referring to the following description in consideration of the accompanying drawings, in which like reference numbers indicate like features, and wherein.

DETAILED DESCRIPTION

Figure 1:
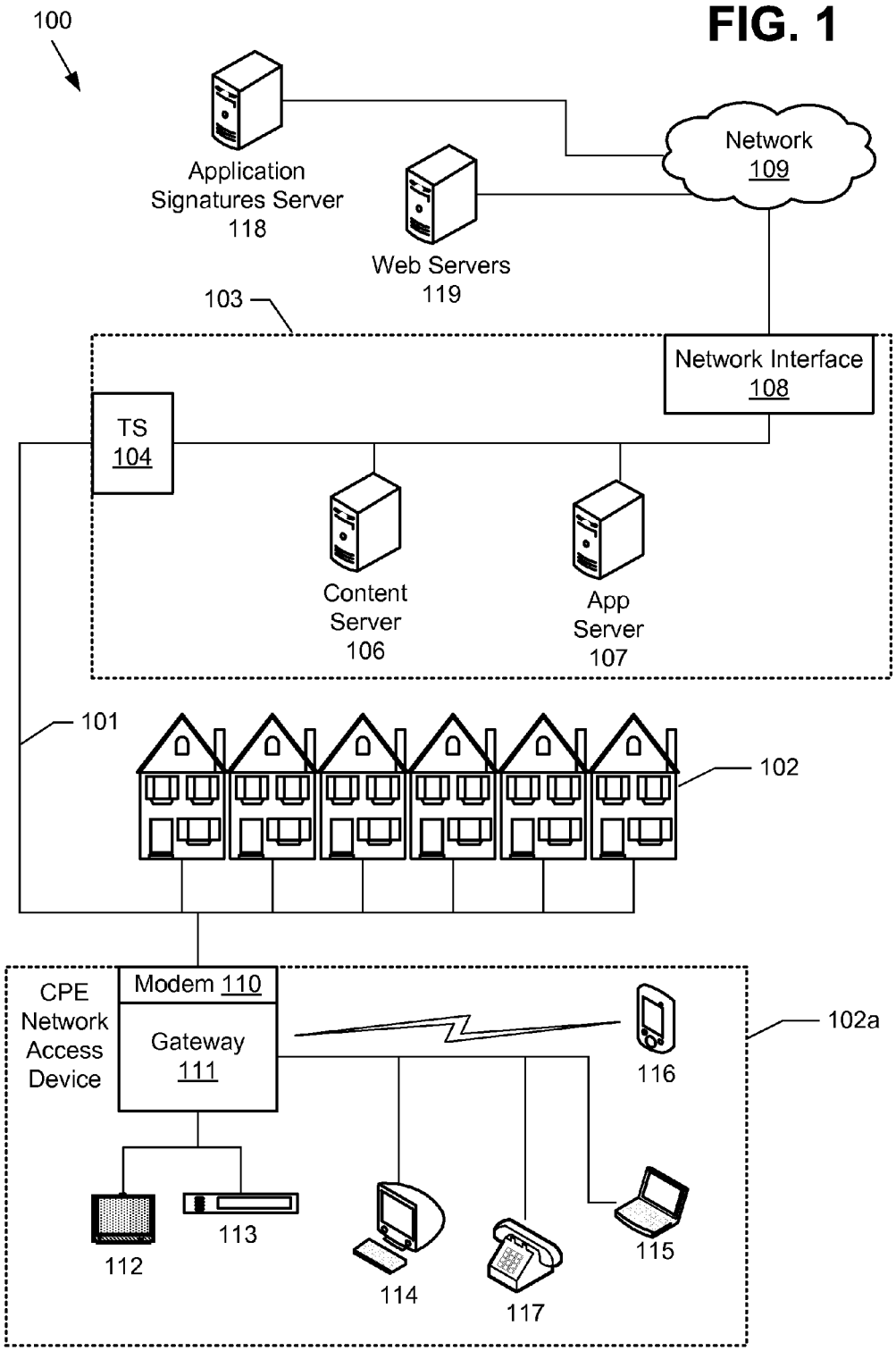
FIG. 1 illustrates an example information distribution network according to one or more aspects as described herein.

FIG. 1 illustrates an example information distribution network 100 on which many of the various features described herein may be implemented. Information distribution network 100 may be, or otherwise include, any type of information distribution network or combination of such networks, such as a satellite network, a landline telephone network, a cellular telephone/data network or other wireless network, the Internet, a wide-area network, a local-area network, etc. One example may be an optical fiber network, a coaxial cable network or a hybrid fiber/coax (HFC) distribution network. Such networks may use a series of interconnected communication links 101 (e.g., coaxial cables, optical fibers, hybrid fiber/coax, wireless links, etc.) to connect multiple homes 102 to a network equipment site 103 (which may be, e.g., a central office or headend). The network equipment site 103 may transmit downstream information signals onto the links 101, and each home 102 may have a receiver used to receive and process those signals.

There may be one or more physical links 101, such as an electrically conductive line, originating from the network equipment site 103, and it may be split a number of times to distribute the signal to various homes 102 in the vicinity (which may be many miles) of the network equipment site 103. Although the term home is used by way of example, locations 102 may be any type of user premises, such as businesses, institutions, etc. The links 101 may include components not illustrated, such as splitters, filters, amplifiers, etc. to help convey the signal clearly, but in general each split introduces a bit of signal degradation. Portions of the links 101 may also be implemented with fiber-optic cable, such as part of a passive optical network (PON) and/or a hybrid-fiber coax network, while other portions may be implemented with coaxial cable, other lines, or wireless communication paths.

The network equipment site 103 may include a termination system (TS) 104, such as a cable modem termination system (CMTS), which may be a computing device configured to manage communications between devices on the network of links 101 and backend devices such as servers 106-107 (to be discussed further below). The TS may be as specified in a standard, such as, in an example of an HFC-type network, the Data Over Cable Service Interface Specification (DOCSIS) standard, published by Cable Television Laboratories, Inc. (a.k.a. CableLabs), or standards relating to various optical networks such as passive optical network (PON) networks, or it may be a similar or modified device instead. The TS may be configured to place data on one or more downstream channels or frequencies to be received by devices, such as modems at the various customer sites 102 (e.g., homes or office buildings), and to receive upstream communications from those modems on one or more upstream frequencies. Because the information distribution network 100 provides services to customers at the customer sites 102, the information distribution network 100 may also be referred to as a service provider network. The network equipment site 103 may also include one or more network interfaces 108, which can permit the network equipment site 103 to communicate with various other external networks 109. These networks 109 may include, for example, the Internet, telephone networks, cellular telephone networks, a PON or other type of fiber optic networks, local wireless networks (e.g., WiMAX), satellite networks, managed services networks, and/or any other desired network. These networks 109 may also be communicatively coupled to, e.g., one or more web servers 119 that are responsible for hosting Internet or Intranet web pages. The network interface 108 may include the corresponding circuitry and/or devices needed to communicate on the network 109, and to other devices coupled to the networks 109 such as a cellular telephone network and its corresponding cell phones.

As noted above, the network equipment site 103 may include a variety of servers 106-107 that may be configured to perform various functions. For example, the network equipment site 103 may include a content server 106. The content server 106 may be one or more computing devices that are configured to provide content to users in the homes. This content may be, for example, multimedia content such as video on demand movies, television programs, songs, text listings, etc. The content server 106 may include software to validate user identities and entitlements, locate and retrieve requested content, encrypt the content, and initiate delivery (e.g., streaming) of the content to the requesting user and/or device.

The network equipment site 103 may also include one or more application servers 107. An application server 107 may be a computing device configured to offer any desired service, and may run various languages and operating systems (e.g., servlets and JSP pages running on Tomcat/MySQL, OSX, BSD, Ubuntu, Redhat, HTML5, JavaScript, AJAX and COMET). For example, an application server may be responsible for collecting data such as television program listings information and generating a data download for electronic program guide listings. Another application server may be responsible for monitoring user viewing habits and collecting that information for use in selecting advertisements. Another application server may be responsible for formatting and inserting advertisements in a video stream being transmitted to the homes 102.

An example home 102a may include a device 110, such as a modem, which may include transmitters and receivers used to communicate on the links 101 and with the network equipment site 103. The device 110 may be, for example, a coaxial cable modem (where the links 101 are or otherwise include coaxial cable lines at the customer premises), a fiber interface node (where the links 101 are or otherwise include fiber optic lines at the customer premises), or any other desired modem device. The device 110 may be connected to, or be a part of, a gateway interface device 111 (gateway 111). The modem 110 and/or the gateway interface device 111, either alone or together, may be considered herein an example of a network access device. The modem 110 and the gateway 111 may be physically separate entities or integrated together as a single device, such as in a common housing and/or rack.

The network access device may be a customer premises equipment (CPE) device. For instance, the network access device may be physically located in, or otherwise at, the residence, office, or other building of the customer served by the network access device. Any or all of local devices 112-117 may also be co-located with the network access device, such as in the same building or campus as the network access device.

The gateway interface device 111 may be or otherwise include a computing device that communicates with modem 110 to allow one or more other devices in the home to communicate with the network equipment site 103 and other devices beyond the network equipment site. The gateway 111 may be or otherwise include, for example, a set-top box (STB), digital video recorder (DVR), computer server, local-area network (LAN) router, or any other desired computing device. The gateway 111 may include LAN interfaces to route and/or otherwise provide communication signals to/from local devices in the home, such as one or more televisions 112, one or more additional STBs 113, one or more personal computers 114 and/or 115, one or more wireless devices 116 (wireless laptops and netbooks, mobile phones, mobile televisions, personal digital assistants (PDA), etc.), one or more voice-over-IP (VoIP) phones 117, and any other desired devices. Examples of the LAN interfaces include Multimedia Over Coax Alliance (MoCA) interfaces, Ethernet interfaces, universal serial bus (USB) interfaces, wireless interfaces (e.g., IEEE 802.11), Bluetooth interfaces, and others. Some of the data exchanged amongst the local devices 112-117 and between the local devices 112-117 and the network access device may be voice data (e.g., data that represents sound such as the human voice, such as VoIP data). For instance, phone 117 may send and/or receive voice data to/from the service provider network via the network access device. Other data exchanged amongst the local devices 112-117 and between the local devices 112-117 and the network access device may be non-voice data (e.g., any other data not considered voice data, such as data that is not VoIP data). VoIP data packets may identify a particular TCP port dedicated to VoIP.

Figure 2:
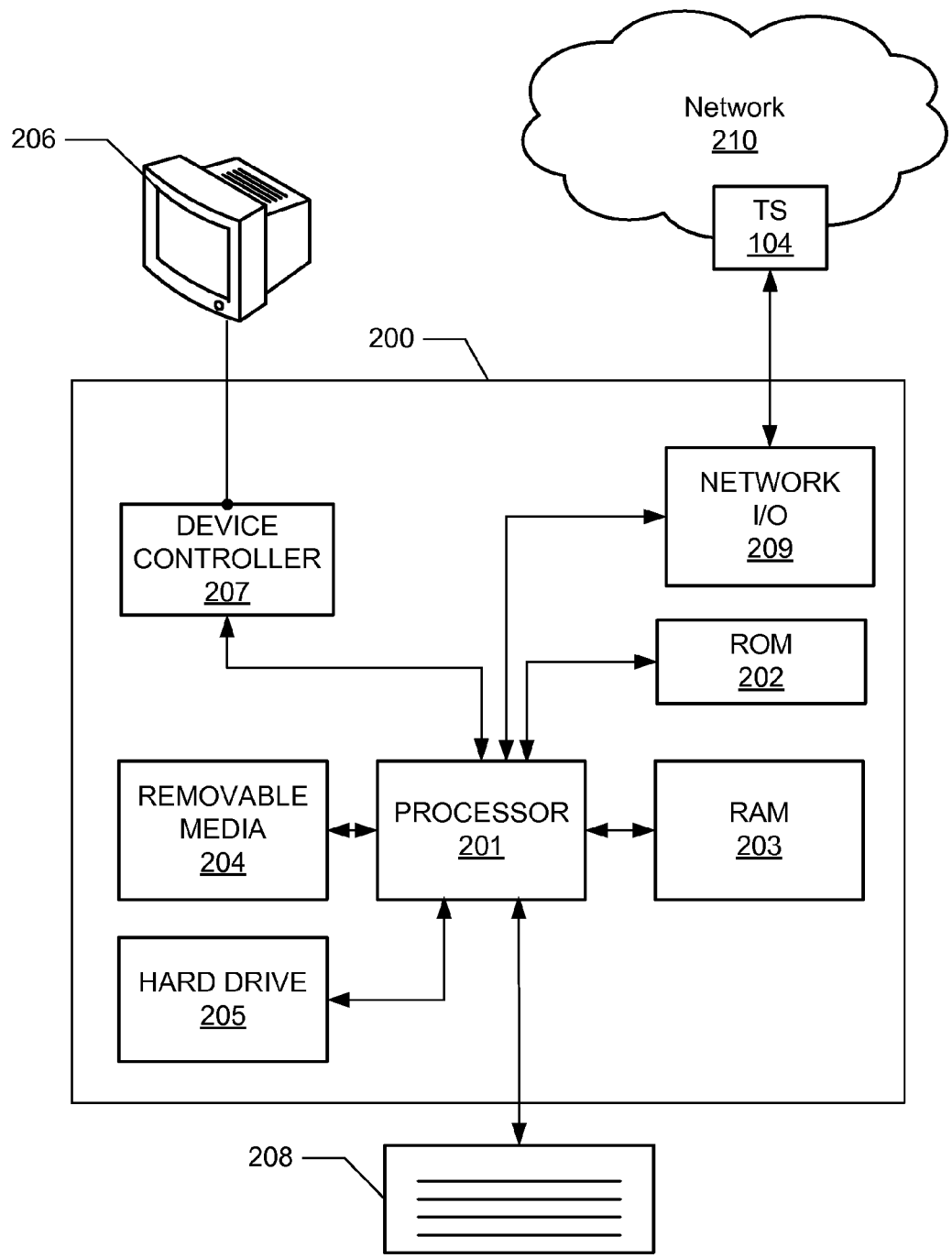
FIG. 2 illustrates an example computing platform on which one or more of the various elements described herein can be implemented.

FIG. 2 illustrates an example of general hardware and/or software elements that can be used to implement any of the various computing devices discussed herein. A computing device 200 (also often referred to as a computer) may include one or more processors 201, which may execute instructions of a computer program to perform any of the features described herein. The instructions may be stored in any type of tangible and/or non-transitory computer-readable medium, such as a memory or hard drive, to configure the operation of the processor 201. For example, instructions may be stored in a read-only memory (ROM) 202, a random access memory (RAM) 203, a removable media 204 such as a Universal Serial Bus (USB) drive, compact disk (CD) or digital versatile disk (DVD), a floppy disk drive, or any other desired data storage medium. Instructions may also be stored in an attached (or internal) hard drive 205. The computing device 200 may include or be coupled to one or more output devices, such as a display 206 (or an external television), and may include one or more output device controllers 207, such as a video processor. There may also be one or more user input devices 208, such as a remote control, keyboard, mouse, touch screen, microphone, etc. The computing device 200 may also include one or more network interfaces, such as input/output circuits 209 (such as a network card) to communicate with an external network 210 via communication and/or negotiation with TS 104. The network interface may be a wired interface, wireless interface, or a combination of the two. In some embodiments, the interface 209 may include a modem (e.g., a cable modem), and network 210 may include the communication links 101 discussed above, TS 104, the external network 109, an in-home network, a provider's wireless, coaxial, fiber, or hybrid fiber/coaxial distribution system (e.g., a DOCSIS or PON network), or any other desired network.

As previously discussed, there may be multiple local devices (e.g., devices 112-117) locally coupled to the network access device, and such coupling may be via, e.g., a local area network (wireless and/or wired) and/or a direct connection to a network access device port. For instance, the local devices may be coupled together via an Ethernet network, an 802.11 wireless network, and/or a MoCA network. Because the total bandwidth on any given physical and/or logical communication path is not infinite, each of these local devices may compete for communication at the local side (e.g., between the local devices and gateway 111) and also at the service network side (e.g., between modem 110 and TS 104). Such communications may be multiplexed, for example, using known time-slicing techniques. For instance, each local device may be able to send and/or receive data to/from the network access device over a particular time slice, such as in a burst of data packets within that time slice. However, bandwidth may be multiplexed and/or otherwise shared between the local devices 112-117 in any manner desired.

While there is some latency experienced by all data transmission, congestion either at the network access device or further upstream may increase the latency. Latency may refer to the time it takes for data to traverse a given communication path. For example, latency may be the amount of time it takes for data from a source to arrive at a destination, or for data and associated response data to make a round trip between the two network locations. Some contributors to latency may include, for example, data propagation delays, data transmission delays, data routing or other processing delays, and data storage delays. Congestion may also contribute to increased jitter, as the instantaneous and/or average latency experienced between two network locations may change depending upon the level of congestion.

While it may not be feasible to completely remove congestion-based latency and jitter for all data without sufficiently increasing bandwidth, it may be feasible to reduce latency and/or jitter for at least a subset of data that is considered to be priority data. This may be particularly useful where a network user is operating multiple local devices and/or software applications, in which some of the local devices and/or software applications are less sensitive to latency and/or jitter than others. Thus, examples will be described below of how to potentially reduce latency and/or jitter for selected data that is considered to be priority data, relative to latency and/or jitter that may be experienced by other non-priority data. As will be seen, the priority data may be queued and/or labeled separately from the non-priority data, such that the priority data may be routed or otherwise forwarded as soon as possible and the non-priority data may be forwarded and/or routed in accordance with a best-effort policy.

Figure 3:
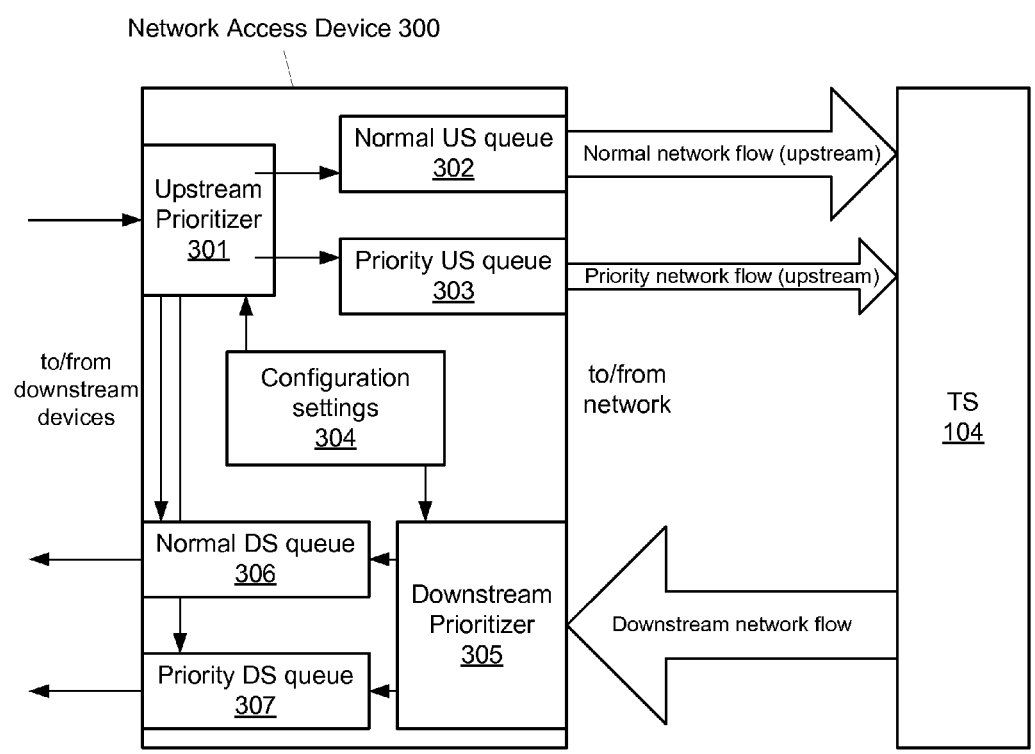
FIG. 3 is a block diagram of an example network and method for a network access device, local devices, and a termination system, in accordance with one or more aspects as described herein.

FIG. 3 is a block diagram of an example a network access device 300. FIG. 3 also shows example data flows with other devices, such as downstream local devices, and with a network termination system. The termination system may be, for example, the TS 104. The network access device 300 may be or otherwise include, for example, the gateway 111, the modem 110, or a combination of the two, and may further be implemented as or otherwise include a computing device such as that shown in FIG. 2. As discussed previously, the network access device 300 may be a CPE device located at the user's premises. The network access device 300 may also be a mobile device used anywhere outside the user's premises. In the shown example, the network access device 300 may include or otherwise provide an upstream prioritizer 301, a normal upstream (US) queue 302, a priority upstream queue 303, data representing configuration settings 304, a downstream prioritizer 305, a normal downstream (DS) queue 306, and a priority downstream queue 307. Each of the elements 301-303 and 305-307 may be implemented by, e.g., circuitry and/or a processor (such as the processor 201) configured in hardware and/or by software. Where software and/or other data are used to configure the processor, such software and/or data may be stored in a computer readable medium (such as the ROM 202, the RAM 203, the removable media 204, and/or the hard drive 205). The elements 301-303 and 305-

307 may further be implemented by, for example, the network I/O 209. Thus, the elements 301-303 and 305-307 may be embodied as, for instance, hardware elements and/or software elements. The configuration settings 304 may be embodied as data at least partially stored in a computer-readable medium local to network access device 300, such as the ROM 202, the RAM 203, the removable media 204, and/or the hard drive 205 of network access device 300, in storage of one or more of the local devices 112-117, and/or in storage upstream on the service network side, such as in application signatures server 118, web servers 119, and/or servers 106-107.

The network access device 300 may be communicatively connected to the TS 104 such as by one of the communication links 101. In addition to downstream data flow from the TS 104 to the network access device 300, separate data flows may travel in the upstream direction from the network access device 300 and the TS 104, depending upon the priority of the data. In the shown example, two upstream logically and/or physically separate data flows are provided: a normal upstream network flow, and a priority upstream network flow. In further embodiments, more than two upstream data flows may be established, each with a different priority level. For example, there may be a low priority upstream network flow, a medium priority upstream network flow, and a high priority upstream network flow. The names of the flows used herein are merely illustrative. For example, the normal upstream network flow referred to herein might alternatively be referred to as a low priority upstream network flow. What is common amongst these various embodiments may be that the different upstream data flows may have different priorities, which means that data in those flows may be sent in accordance with different policies. For example, data sent in the normal upstream network flow may be processed, sent, and/or routed on a best-effort basis, and/or associated with a first particular one or more QoS parameter values, whereas data in the priority upstream network flow may be processed, sent, and/or routed on a real-time or as-soon-as-possible basis, and/or associated with a second particular one or more QoS parameter values. Thus, the priority data may take precedence over data in the normal upstream network flow where there is bandwidth conflict between the two flows. Also, while only a single downstream network flow is shown in FIG. 3, the downstream direction between the TS 104 and the network access device 300 may likewise include multiple flows with different priorities and policies. All of the upstream and downstream flows may be simultaneously sent between the TS 104 and the network access device 300 on the same physical transmission medium, such as one of the communication links 101, or on multiple physical transmission media.

In some embodiments, where the communication between the network access device 300 and the TS 104 is in accordance with, for example, DOCSIS, the various data flows each may be associated with a different DOCSIS service flow, each having its own DOCSIS service identifier (SID) and its own one or more quality of service (QoS) parameters. The QoS parameters may include parameters that define or otherwise affect expectations of, for example, bandwidth, data rate, latency, jitter, throughput speed, and/or error rate. In the case of DOCSIS, the normal upstream network flow may be, for example, a DOCSIS best effort (BE) or DOCSIS non-real-time polling service (nrtPS) service flow, and the priority upstream network flow may be, for example, a DOCSIS unsolicited grant service (UGS) or real-time polling service (RGS) service flow. Examples of DOCSIS QoS parameters that may have certain values associated with certain priorities include traffic priority, maximum concatenated burst, upstream scheduling service type, request/transmission policy, maximum sustained traffic rate (Tmax), maximum traffic burst, minimum reserved traffic rate (Tmin), assumed minimum packet size, unsolicited grant size, grants per interval, nominal grant interval, tolerated grant jitter, nominal polling interval, and/or tolerated poll jitter. Of course, where other protocols are used between the network access device 300 and the TS 104, other QoS parameters may be associated with the various priority levels.

Moreover, the QoS parameters themselves may or may not be sent from the network access device 300 to the TS 104. Thus, in some embodiments, an indicator representative of a particular QoS parameter value, or representative of a combination of particular QoS parameter values, may be sent by the network access device 300 to the TS 104. For instance, a priority indicator such as a particular bit or byte value in a packet being sent upstream by the network access device 300 may indicate to the TS 104 that a particular one or more QoS parameter values should be used for communication of a data flow from the network access device 300. As an example, where link 101 includes a DOCSIS link, the priority indicator may be a DOCSIS priority indicator, and depending upon the value of the priority indicator tagged for the packet(s) sent by the network access device 300, the TS 104 may interpret the priority indicator as being associated with a particular Tmin value and/or one or more particular other QoS parameter values. Or, where the link 101 is a passive optical network (PON) link, the network access device 300 may tag upstream packets with PON priority indicators according to their determined priorities In turn, the TS 104 may recognize and prioritize the packets based on the PON priority indicators.

In operation, data sent upstream from any of the local devices (e.g., the local devices 112-117) may be received and prioritized by the upstream prioritizer 301. Data that is determined to be of high priority is forwarded to the priority upstream queue 303, and data that is considered to be of normal priority is forwarded to the normal upstream queue 302. In other embodiments where there are multiple levels of higher priority, then the upstream prioritizer 301 may separate the data into three or more upstream queues based on determined priority. Upstream data may be prioritized and forwarded at any level of granularity desired, such as on a packet-by-packet basis or a frame-by-frame basis. Data received at the normal upstream queue 302 may be forwarded to the TS 104 according to a first policy via the normal upstream network flow, and data received at the priority upstream queue 303 may be forwarded to the TS 104 according to a second policy via the priority upstream network flow. Thus, data packets may be forwarded to the TS 104 in an order that depends upon their relative priorities.

Likewise, data sent downstream from the TS 104 may be received and prioritized by the downstream prioritizer 305. Data that is determined to be high priority is forwarded to the priority downstream queue 307, and data that is considered to be of normal/low priority is forwarded to the normal downstream queue 306. In other embodiments where there are multiple levels of higher priority, then the downstream prioritizer 305 may separate the data into three or more downstream queues based on determined priority. Downstream data may be prioritized and forwarded at any level of granularity desired, such as on a packet-by-packet basis or a frame-by-frame basis. Data received at the normal downstream queue 306 may be forwarded to the one or more of the local devices according to a third policy, and data received at the priority downstream queue 307 may be forwarded to the one or more local devices according to a fourth policy. Thus, data packets may be forwarded to the one or more local devices in an order that depends upon their relative priorities. In some embodiments, data sent between the local devices 112-117 and the network access device 300 may be in accordance with, e.g., Internet Protocol (IP). In such embodiments, the data packets forwarded by the normal and priority downstream queues may be marked with different IP header QoS markings, such as different differentiated services code point (DSCP) markings.

While the various upstream and downstream queues 302, 303, 306, and 307 are depicted in FIG. 3 as separate elements, such separation may be physical and/or logical. For example, upstream queues 302 and 303 (or downstream queues 306 and 307) may be physically separate (e.g., separate buffer circuitry) or physically integrated. In some embodiments, queues 302, 303, 306, and/or 307 may be implemented as one or more first-in-first-out (FIFO) buffers, and may be part of, e.g., the modem 110.

The network access device 300 may determine whether upstream and/or downstream data is of a certain priority based on one or more configuration settings. The configuration settings may indicate, for example, which of the local devices are to be associated with high priority data and/or which are to be associated with normal priority data. The local devices may be identified by, e.g., media access control (MAC) address, IP address, device name, device serial no., etc. For example, the configuration settings may indicate that a first MAC address is to be associated with normal priority data and/or that a second MAC address is to be associated with high priority data. In this example, the network access device 300 may send upstream data from the local device having the first MAC address to the normal upstream queue 302 and upstream data from the local device having the second MAC address to the priority upstream queue 303. Likewise, the network access device 300 may send downstream data addressed to the local device having the first MAC address to the normal downstream queue 306 and downstream data addressed to the local device having the second MAC address to the priority downstream queue 307.

The configuration settings may additionally or alternatively indicate which physical ports and/or logical ports are to be associated with high priority data and/or which are to be associated with normal priority data. Where the network access device 300 is or includes a router, the physical ports may be, for example, router ports. Examples of logical ports that may be indicated include transmission control protocol (TCP) ports and/or user datagram protocol (UDP) ports. For example, the configuration settings may indicate that a first port is to be associated with normal priority data and/or that a second port is to be associated with high priority data. In this example, the network access device 300 may send upstream data utilizing the first port to the normal upstream queue 302 and upstream data utilizing the second port to the priority upstream queue 303. Likewise, the network access device 300 may send downstream data utilizing the first port to the normal downstream queue 306 and downstream data utilizing the second port to the priority downstream queue 307.

The configuration settings may additionally or alternatively indicate which software applications are to be associated with high priority data and/or which are to be associated with normal priority data. For example, the configuration settings may indicate that a first software application is to be associated with normal priority data and/or that a second software application is to be associated with high priority data. In this example, the network access device 300 may send upstream data generated by the first software application to the normal upstream queue 302 and upstream data generated by the second software application to the priority upstream queue 303. Likewise, the network access device 300 may send downstream data used and/or requested by the first software application to the normal downstream queue 306 and downstream data used and/or requested by the second software application to the priority downstream queue 307. As will be discussed further below, such application software-based configuration settings may be implemented, for example, through the use of deep-packet inspection (DPI) techniques and an application signatures library to identify the software application associated with a given upstream and/or downstream data packet.

Figure 4:
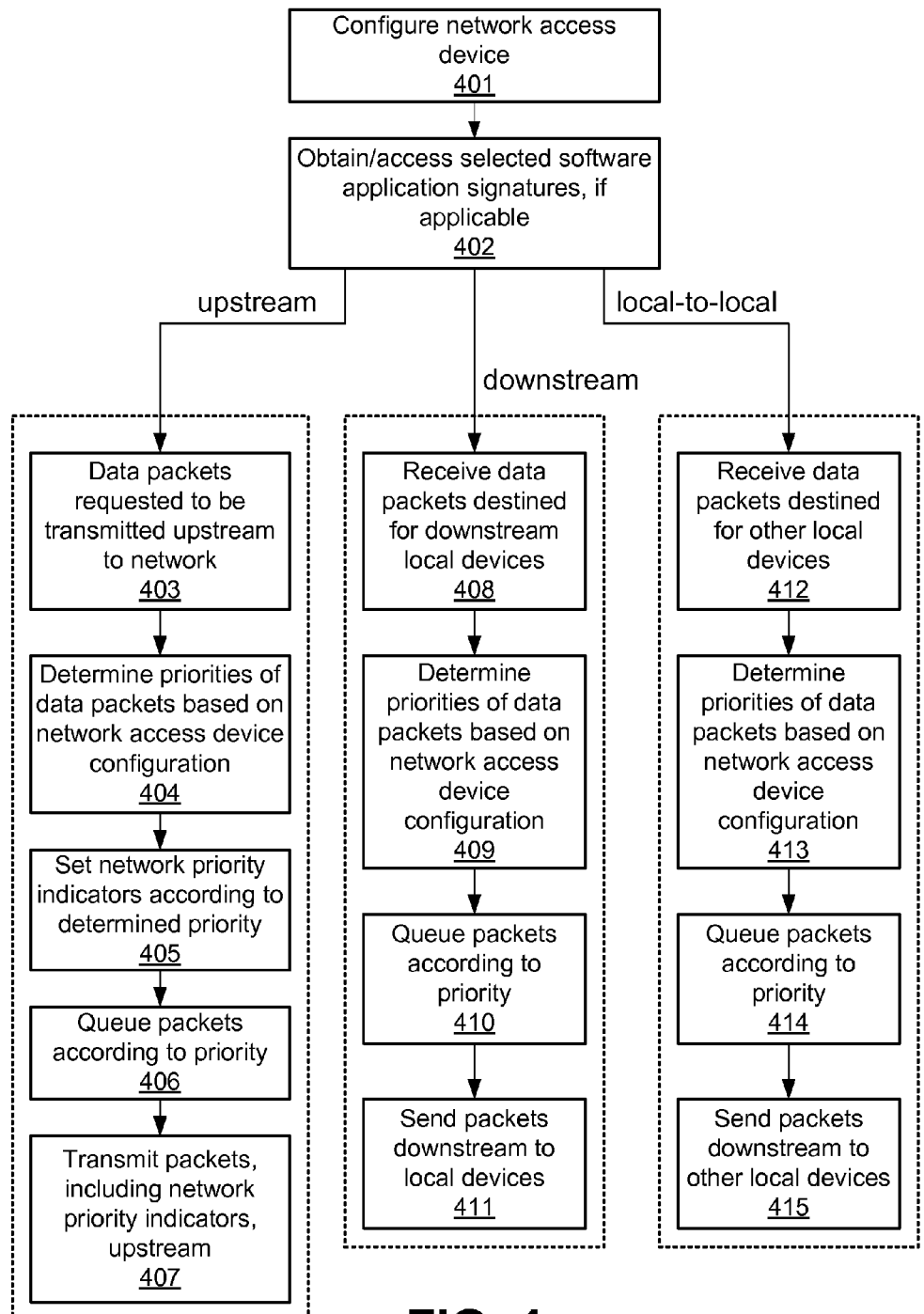
FIG. 4 is a flow chart of an example method for implementing data priority at a network access device according to one or more aspects as described herein.

FIG. 4 is a flow chart of an example method for implementing data priority at a network access device according to one or more aspects as described herein. By way of example, the flow chart will be described as steps that may be performed by the network access device 300.

At step 401, the network access device 300 may be configured with various priority configuration settings. As described previously, the configuration settings may identify criteria for determining the priority of upstream and/or downstream data, such which local devices, physical ports, logical ports, and/or software applications are to be associated with which level of priority. Step 401 may also include establishing policies associated with the various priority levels. For example, one policy may indicate that particular values of one or more QoS parameters be specified to be used with various priority levels.

Figures 5, 6:
FIG. 5 is a screen shot of an example user interface that may be used to configure priority or other aspects.
FIG. 6 is a screen shot of another example user interface that may be used to configure priority or other aspects.

Some or all of the configuration settings may be user-configurable, or alternatively they may be predetermined and not user-configurable such as by being encoded through firmware by the manufacturer into the network access device 300. Where configuration settings are user-configurable, they may be configurable via a user interface. An example screen shot of such a user interface (which may be local or remote) is shown in FIG. 5. As can be seen, the user interface may display the existing configuration settings and may allow the user to modify some or all of the configuration settings in various categories (e.g., in FIG. 5, the categories would be MAC address, TCP port, software application, and router port). In the shown example, the configuration settings are presented in the user interface as a set of displayed interactive tables, however the settings may be displayed in any manner desired. To modify the configuration settings in the user interface of FIG. 5, the user could simply place the cursor in the appropriate box and change the values therein.

The example settings of FIG. 5 may be interpreted as follows—a packet is considered high priority and sent to the priority upstream or downstream queue 303, 307, if the packet (is sent/received to/from a device having MAC address 00-1F-3B-72-FF-A1 or 5E-71-F4-C1-11-00) OR (specifies a TCP port in the range of 6881 to 6999) OR (is sent/received through router port 2) OR (is a packet for software applications Halo3, Call or Duty, or World of Warcraft). While gaming software applications are referred to in FIG. 5, this is merely an example, and any other type of software application may be references in the configuration settings. Moreover, to resolve priorities across different categories, a rule may be user-defined via the user interface (or predetermined and not user-definable) that indicates a hierarchy of categories. For instance, the rule may indicate whether a packet associated with a high-priority MAC address should supersede a packet associated with a high-priority software application.

If the network access device 300 determines that, for a given packet, the above Boolean statement is true, then the packet may be classified as a priority packet and sent to the priority upstream or downstream queue 303, 307. If the network access device 300 determines that, for a given packet, the above Boolean statement is not true, then the packet may be classified as a normal packet and sent to the normal upstream or downstream queue 302, 306. Thus, the user may control and adjust configuration settings that, in turn, define a set of rules by which the network access device 300 determines whether each packet transferred upstream toward the TS 104 or received from the TS 104 is to be classified as a priority packet.

Of course, the above is merely an example, and many other combinations of configuration settings are possible. For example, while the various configuration settings in the example described above were explained as being combined in a Boolean OR statement, the configuration settings may be combined and defined in any other way desired. For instance, the user interface may allow the user to require that the network access device 300 may classify a data packet as a priority packet only if it: (is sent/received to/from a device having MAC address 00-1F-3B-72-FF-A1 or 5E-71-F4-C1-11-00) AND (is sent/received through router port 2) OR (specifies a TCP port in the range of 6881 to 6999). As another example, where multiple levels of priority are desired, each setting may allow the user to input a particular priority level, such as a level from 1 to 5 or from 1 to 16 (depending upon how many levels of priority are provided).

FIG. 6 shows another portion of an example user interface, which might be displayed responsive to the user selecting the "Modify . . . " button in the user interface of FIG. 5, indicating that the user wishes to modify the listed software applications. In the FIG. 6 screenshot, a list of various software applications may be displayed, and may be selectable as being priority or non-priority software applications, such as by checking or un-checking an associated box. Again, where multiple possible levels of priority are provided, the user interface may allow the user to input a particular priority level for each selected software application, such as a level from 1 to 5 or from 1 to 16 (again, depending upon how many levels of priority are provided).

The user interface of FIG. 6 may also include an indication 601 of the expected bandwidth usage of the selected priority software applications. In the present example, the indication 601 is a bar that shows the expected bandwidth to be used (or historically already used) by the three selected software applications. Where the amount of bandwidth represents expected bandwidth for each software application, the expected bandwidth may be predetermined, e.g., obtained from a look-up table, based on information such as from the software application manufacturer. Such a look-up table or other information may be, e.g., downloaded from a network such as the Internet (e.g., one of the web servers 119 and/or the application signatures server 118). The bar format is merely an example—the indication 601 may be any graphical and/or textual indication as desired.

The user interface of FIGS. 5 and 6 may be generated and presented locally by, e.g., the network access device 300. This may be desirable where at least some of the configuration setting information is stored locally to the network access device 300, such as at element 304. However, some or all of the user interface may be generated by a source outside of the network access device 300, such as by a computing device downstream or upstream from the network access device 300. An example of such a computing device is one of the web servers 119 and/or the application signatures server 118.

Referring again to FIG. 4, upon configuration of the network access device 300, in step 402 the network access device 300 may obtain the application signatures of those software applications selected in step 401 as being priority software applications. The application signatures may be downloaded from, e.g., the application signatures server 118 and stored locally at the network access device 300, such as in the storage element that stores configuration information 304. An application signature may indicate one or more features of a data packet or group of data packets, such as the format or the packet or packets. One common way of reviewing packets for comparison with application signatures is to perform deep-packet inspection (DPI). Such an inspection may involve examining packet format and/or content at any or all of layers 4, 5, 6, and/or 7 of the OSI model, to determine which application the packet(s) (and/or the service flow containing the packet(s)) belongs to. The network access device 300 may now be ready to prioritize upstream, downstream, and/or local-to-local data based on the configuration information 304, which will be described by way of example with reference to steps 403-415.

The remainder of the flowchart of FIG. 4 is divided into three situations—on the left side is a process that may be performed to prioritize packets being sent upstream from one or more of the local devices 112-117 to, e.g., the TS 104, in the middle side is a process that may be performed to prioritize packets being sent downstream from, e.g., the TS 104, to one or more of the local devices 112-117, and on the right side is a process that may be performed to prioritize packets being sent between local devices 112-117 ("local-to-local" communication). The upstream, downstream, and local-to-local processes may be performed simultaneously and/or independent of one another. For instance, the network access device 300 may multitask between processing upstream packets, downstream packets, and local-to-local packets.

Beginning with the upstream process of FIG. 4, at step 403 one of the local devices 112-117 may send one or more data packets to the network access device 300 for forwarding upstream to, e.g., the network via the TS 104. These packets may be sent via, e.g., an IP protocol. At step 404, in response to the detected incoming packets, the upstream prioritizer 301 may determine the priority or priorities of the one or more packets based on comparison of those packets with the previously-determined configuration settings 304, such as in the manner described above. Once the priority for each data packet (or group of packets) is determined, at step 405 the upstream prioritizer 301 may label the packets with appropriate priority indicators. The labels may be located in, e.g., the headers of the packets themselves or in encapsulating larger packets/frames. For example, where the communication protocol between the network access device 300 and the TS 104 is DOCSIS, the upstream prioritizer 301 may set one or more DOCSIS QoS parameters for those packets according to the determined priority. This step or any subsequent step may also involve transforming/encapsulating the packets into a format appropriate for the protocol used between the network access device 300 and the TS 104. In other words, the packets sent upstream to the TS 104, while based on the packets received by the upstream prioritizer 301, may or may not be of the same packet format. For example, the packets sent to the TS 104 may have the same payloads as, but different and/or additional headers from, the corresponding packets received by the upstream prioritizer 301. The term "packet" as used throughout the present specification may refer in a generalized way to groupings of data in any protocol desired, including data frames, and is not limited to any particular data size or format. Each packet may include one or more headers and a payload.

At step 406, the upstream prioritizer 301 may direct the packets to the appropriate upstream queue 302 or 303, depending upon the determined priority, and at step 407, the queued packets may be transmitted over the communication line(s) 101 to the TS 104 in accordance with the operating characteristics of the respective upstream queue and/or the network. This upstream process may be repeated for each packet or group of packets to be sent upstream. Since some or all of the packets transmitted upstream to the TS 104 may include the priority indicators added by the network access device 300, the TS 104 and/or any other portions of the upstream network may choose to treat those packets in accordance with the priority indicators.

The downstream process of FIG. 4, steps 408-411, may operate as follows. At step 408, the TS 104 may send one or more data packets to the network access device 300 for forwarding to one or more of the local devices 112-117. These packets may be sent via, e.g., a DOCSIS protocol. At step 409, in response to the detected incoming packets, the downstream prioritizer 305 may determine the priority or priorities of the one or more packets based on comparison of those packets with the previously-determined configuration settings 304, such as in the manner described above. The downstream prioritizer 305 may also label the packets with appropriate priority indicators. The priority indicators may be located in, e.g., the headers of the packets themselves or in encapsulating larger packets/frames. This step or any subsequent step may also involve transforming/encapsulating the packets into a format appropriate for the protocol used between the network access device 300 and the local devices 112-117. In other words, the packets sent downstream to the local devices 112-117, while based on the packets received by the downstream prioritizer 305, may or may not be of the same packet format. For example, the packets sent to the local device 112-117 may have the same payloads as, but different and/or additional headers from, the corresponding packets received by the downstream prioritizer 305.

Moreover, since the protocol on the local side of the network access device 300 may be different from the protocol on the TS side of the network access device 300, the priority indicators attached to the local-side downstream packets may be of a different type from those attached to the upstream packets headed towards the TS 104. While the priority indicators may be utilized by the local devices 112-117, it is also possible that the network access device 300 does not label the downstream packets with these priority indicators, such that prioritization may occur only with the network access device 300.

At step 410, the downstream prioritizer 305 may direct the packets to the appropriate downstream queue 306 or 307, depending upon the determined priorities of the packets, and at step 411, the queued packets may be transmitted to the local devices 112-117 in accordance with the operating characteristics of the respective downstream queue and/or the LAN. This downstream process may be repeated for each packet or group of packets to be sent downstream.

The local-to-local process of FIG. 4, steps 412-415, may operate as follows. At step 412, one of the local devices 112-117 may send one or more data packets to the network access device 300 for forwarding to one or more of the other local devices 112-117. These packets may be sent via, e.g., an IP protocol. At step 413, in response to the detected incoming local-to-local packets, the upstream prioritizer 301 may determine the priority or priorities of the one or more packets based on comparison of those packets with the previously-determined configuration settings 304, such as in the manner described above. The upstream prioritizer 301 may also label the packets with appropriate priority indicators. The priority indicators may be located in, e.g., the headers of the packets themselves or in encapsulating larger packets/frames. While the priority indicators may be utilized by the local devices 112-117, it is also possible that the network access device 300 does not label the local-to-local packets with these priority indicators, such that prioritization may occur only with the network access device 300.

At step 414, the upstream prioritizer 301 may direct the local-to-local packets to the appropriate downstream queue 306 or 307, depending upon the determined priorities of the packets, and at step 411, the queued packets may be transmitted to the local devices 112-117 in accordance with the operating characteristics of the respective downstream queue and/or the LAN. This downstream process may be repeated for each local-to-local packet or group of packets.

In some embodiments, upstream, downstream, and/or local-to-local packets may be prioritized by the network access device 300 without necessarily utilizing separate normal and priority queues. For instance, there may be a single upstream queue and/or a single downstream queue, where those queues are not necessarily FIFO queues. In general, such a queue may implement any number of algorithms that result in higher priority packets being send earlier than normal priority packets. For instance, packets may be inserted into a position within the queue, and/or rearranged in various positions within the queue, in accordance with their priorities. In still further embodiments where multiple upstream and/or downstream queues are utilized, these queues may be physically separate, or they may be logically separate even though they share the same physical resources.

Thus, various examples of systems, apparatuses, method, and software have been described that may allow a CPE network access device to prioritize upstream and/or downstream data between local devices and a service provider network. Moreover, prioritization preferences may be customizable by the customer that is in control of the CPE network access device.

While illustrative systems and methods as described herein embodying various aspects of the present disclosure are shown, it will be understood by those skilled in the art that the disclosure is not limited to these embodiments. Modifications may be made by those skilled in the art, particularly in light of the foregoing teachings. For example, each of the features of the aforementioned illustrative examples may be utilized alone or in combination or subcombination with elements of the other examples. Moreover, one of ordinary skill in the art will appreciate that the flowchart steps illustrated in the illustrative figures may be performed in other than the recited order, and that one or more blocks or steps illustrated in any of the figures may be optional in accordance with aspects of the disclosure. The description is thus to be regarded as illustrative of, rather than restrictive on, the present disclosure.

The invention claimed is:

1. A method, comprising:
receiving, at a computing device associated with a user, an identification of a software application and an identification of a local device communicatively coupled to the computing device, wherein the identification of the software application comprises a first application signature;
determining, by the computing device, whether a received data packet identifies the local device and is associated with the software application;
assigning a user-identified priority indicator to the received data packet responsive to if a second application signature associated with the received data packet corresponds to the first application signature and the received data packet identifies the
local device, wherein the second application signature is obtained from the received data packet by examining a format of the received data packet; and
sending the data packet via a network flow associated with the priority indicator.

2. The method of claim 1, wherein the determining comprises comparing the received data packet with the first application signature.

3. The method of claim 2, further comprising sending through the network flow, a request for the first application signature based on the identification of the software application.

4. The method of claim 1, further comprising generating a user interface on a display device for receiving the identification of the software application.

5. The method of claim 4, wherein the user interface comprises a plurality of software application identifications, and wherein the identification of the software application is one of a plurality of software application identifications.

6. The method of claim 1, further comprising receiving the data packet as an Internet Protocol (IP) data packet and sending the data packet as a Data Over Cable Service Interface Specification (DOCSIS) packet.

7. The method of claim 1, wherein the priority indicator comprises a quality of service (QoS) parameter.

8. The method of claim 1, wherein the priority indicator comprises a priority parameter.

9. The method of claim 1, further comprising identifying the local device by a media access control (MAC) address.

10. The method of claim 1, further comprising:
receiving an identification of a port of the computing device;
determining whether the received data packet is received at the port; and
assigning the priority indicator in response to determining that the data packet is received at the port.

11. The method of claim 1, further comprising:
receiving an identification of a numerical range of transmission control protocol (TCP) ports; and
determining whether a transmission control protocol port identified by the received data packet is within the numerical range; and,
assigning the priority indicator in response to determining that the transmission control protocol port identified by the received data packet is within the numerical range.

12. A method, comprising:
receiving, at a computing device associated with a user, an identification of a software application, the identification comprising an application signature and an identification of a local device communicatively coupled to the computing device;
assigning, by the computing device, a user-identified priority level to the software application;
determining, by the computing device, whether a received data packet identifies the local device and is associated with the software application based on the application signature based on a second application signature obtained from the received data packet by examining content of one or more layers of the received data packet;
assigning, by the computing device, the user-identified priority level to the received data packet if the data packet identifies the local device and is associated with the software application; and
sending the received data packet in an order relative to other data packets based on the user-identified priority level in response to determining that the received data packet identifies the local device and is associated with the software application.

13. The method of claim 12, further comprising receiving the data packet as an Internet Protocol (IP) data packet and sending the data packet as a Data Over Cable Service Interface Specification (DOCSIS) packet.

14. The method of claim 12, further comprising receiving the data packet as a Data Over Cable Service Interface Specification (DOCSIS) packet and sending the data packet as an Internet Protocol (IP) data packet.

15. The method of claim 12, further comprising:
receiving an identification of a port of the computing device; and
determining whether the received data packet is received at the port; and,
sending the received data packed in an order relative to other data packets further based on whether the data packet is received at the port.

16. The method of claim 12, further comprising:
receiving an identification of a numerical range of transmission control protocol (TCP) ports; and
determining whether a transmission control protocol port identified by the received data packet is within the numerical range; and
sending the received data packed in an order relative to other data packets further based on whether the transmission control protocol port identified by the data packet is within the numerical range.

17. A method, comprising:
receiving, at a computing device associated with a user and via a user interface, information identifying a first software application and identifying a local device communicatively coupled to the computing device;
assigning, by the computing device, a first user-identified priority to the first software application;
receiving, at the computing device via the user interface, information identifying a second software application and assigning a second user-identified priority to the second software application, wherein the second user-identified priority is different from the first user-identified priority;
receiving a plurality of data packets and determining a software application based on an application signature obtained from each respective data packet through the use of deep-packet inspection techniques and determining a local device associated with each respective data packet;
sending data packets associated with the first software application and the local device as a first network flow having the first user-identified priority; and
sending data packets associated with the second software application as a second network flow having the second user-identified priority, wherein the first network flow is separate from the second network flow.

18. The method of claim 17, wherein the first network flow is either a best effort flow or a non-real-time polling service flow, and the second network flow is either an unsolicited grant service flow or a real-time polling service flow.

19. The method of claim 8, wherein the priority parameter comprises at least one of a traffic priority parameter, a maximum concatenated burst parameter, an upstream scheduling service type parameter, a request/transmission policy parameter, a maximum sustained traffic rate (Tmax) parameter, a maximum traffic burst parameter, a minimum reserved traffic rate (Tmin) parameter, an assumed minimum packet size parameter, an unsolicited grant size parameter, a grants per interval parameter, a nominal grant interval parameter, a tolerated grant jitter parameter, a nominal polling interval parameter, and a tolerated poll jitter parameter.

* * * * *

UNITED STATES PATENT AND TRADEMARK OFFICE
CERTIFICATE OF CORRECTION

| | | |
|---|---|---|
| PATENT NO. | : 8,972,537 B2 | Page 1 of 1 |
| APPLICATION NO. | : 13/210635 | |
| DATED | : March 3, 2015 | |
| INVENTOR(S) | : Chris Bastian et al. | |

It is certified that error appears in the above-identified patent and that said Letters Patent is hereby corrected as shown below:

In the Specification,

Column 13, Detailed Description, Line 2:
    Please delete "line(s)" and insert --link(s)--

In the Claims,

Column 14, Line 63:
    In Claim 1, after "the", delete "¶"

Signed and Sealed this
Eighth Day of September, 2015

Michelle K. Lee
*Director of the United States Patent and Trademark Office*